US012657738B2

(12) United States Patent
Park et al.

(10) Patent No.: US 12,657,738 B2
(45) Date of Patent: Jun. 16, 2026

(54) ANALYSIS METHOD AND ANALYSIS SYSTEM OF PARTICLES THROUGH OPTICAL OBSERVATION

(71) Applicant: POSTECH RESEARCH AND BUSINESS DEVELOPMENT FOUNDATION, Pohang-si (KR)

(72) Inventors: Jae-Sung Park, Pohang-si (KR); Si-Woo Cho, Suwon-si (KR)

(73) Assignee: POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 311 days.

(21) Appl. No.: 18/572,866

(22) PCT Filed: Feb. 7, 2022

(86) PCT No.: PCT/KR2022/001829
§ 371 (c)(1),
(2) Date: Jan. 22, 2024

(87) PCT Pub. No.: WO2022/270709
PCT Pub. Date: Dec. 29, 2022

(65) Prior Publication Data
US 2024/0289967 A1 Aug. 29, 2024

(30) Foreign Application Priority Data
Jun. 22, 2021 (KR) ........................ 10-2021-0081114

(51) Int. Cl.
*G06T 7/246* (2017.01)
*G01N 15/02* (2024.01)
(Continued)

(52) U.S. Cl.
CPC ................ *G06T 7/246* (2017.01); *G06T 7/74* (2017.01); *G06T 2200/24* (2013.01);
(Continued)

(58) Field of Classification Search
USPC .......................................... 382/103, 107, 128
See application file for complete search history.

(56) References Cited

U.S. PATENT DOCUMENTS 9,176,152 B2 * 11/2015 Knutson ................ G16B 99/00
9,418,416 B2 * 8/2016 Milne ................ G01N 15/1433
(Continued)

FOREIGN PATENT DOCUMENTS

KR 10-2016-0138143 12/2016
KR 10-2019-0002219 1/2019
(Continued)

OTHER PUBLICATIONS

KIPO, PCT Search Report of PCT/KR2022/001829 dated May 16, 2022.
KIPO, Office Action of KR 10-2021-0081114 dated Jan. 2, 2023.

*Primary Examiner* — Ishrat I Sherali
(74) *Attorney, Agent, or Firm* — LEX IP MEISTER, PLLC

(57) ABSTRACT
Disclosed are an analysis method and computational system which have been developed so that the particle tracking analysis method can derive correct results under conditions with different photographing conditions for each frame when analyzing the various characteristics of individual particles through the particle tracking analysis method from consecutive images in which particles are photographed.

10 Claims, 9 Drawing Sheets

(51) Int. Cl.
    *G01N 21/47*       (2006.01)
    *G06T 7/73*        (2017.01)

(52) U.S. Cl.
    CPC ............... *G06T 2207/10028* (2013.01); *G06T 2207/10152* (2013.01); *G06T 2207/20076* (2013.01); *G06T 2207/30204* (2013.01); *G06T 2207/30241* (2013.01)

(56)           References Cited

U.S. PATENT DOCUMENTS

| | | | | |
|---|---|---|---|---|
| 9,939,363 | B2 * | 4/2018 | Wachemig | G01N 15/0211 |
| 11,513,333 | B2 * | 11/2022 | Ashcroft | G01N 15/1429 |
| 2013/0274119 | A1 | 10/2013 | Knutson et al. | |
| 2014/0177932 | A1 * | 6/2014 | Milne | G06T 7/60 |
| | | | | 382/128 |
| 2017/0059471 | A1 * | 3/2017 | Wachemig | G01N 15/1433 |
| 2017/0242234 | A1 | 8/2017 | Ashcroft et al. | |
| 2022/0244161 | A1 * | 8/2022 | Misawa | G01N 15/0211 |
| 2024/0418627 | A1 * | 12/2024 | Sandoghdar | G01N 15/1433 |

FOREIGN PATENT DOCUMENTS

| | | | | |
|---|---|---|---|---|
| KR | 10-2019-0038083 | | 4/2019 | |
| KR | 20190038083 | * | 4/2019 | G01N 15/20 |
| KR | 10-1986903 | | 6/2019 | |
| WO | 2012060163 | | 5/2014 | |

* cited by examiner

[FIG. 1]
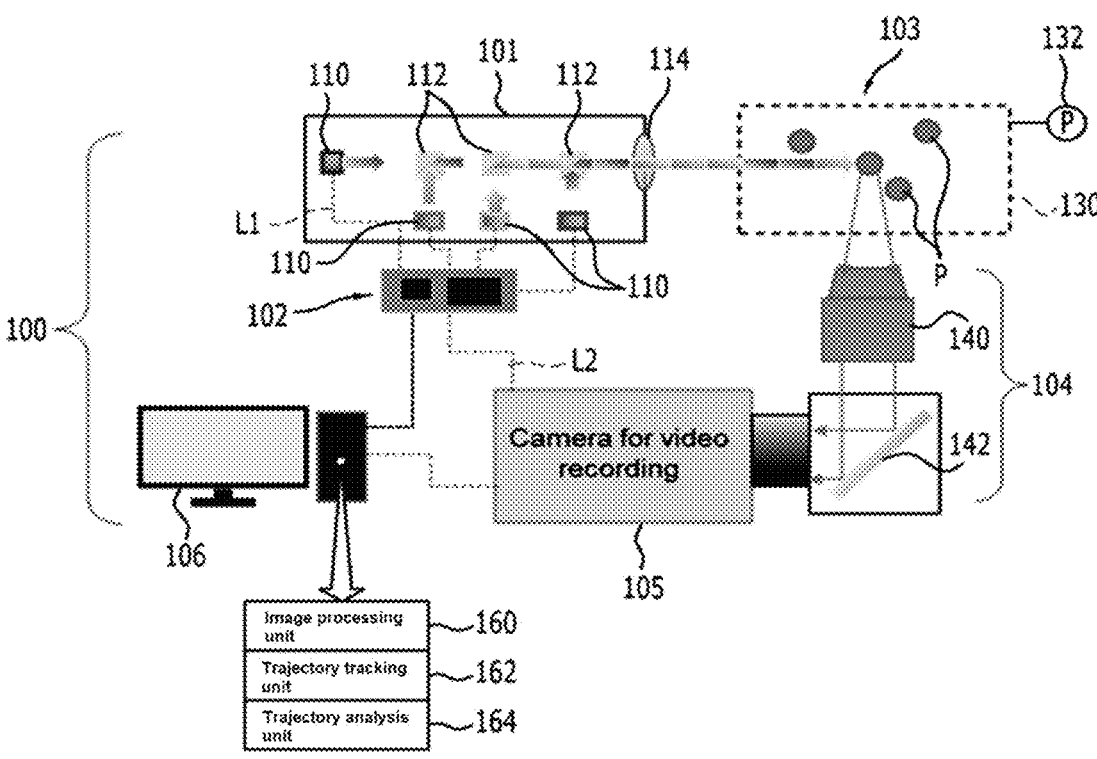

[FIG. 2]
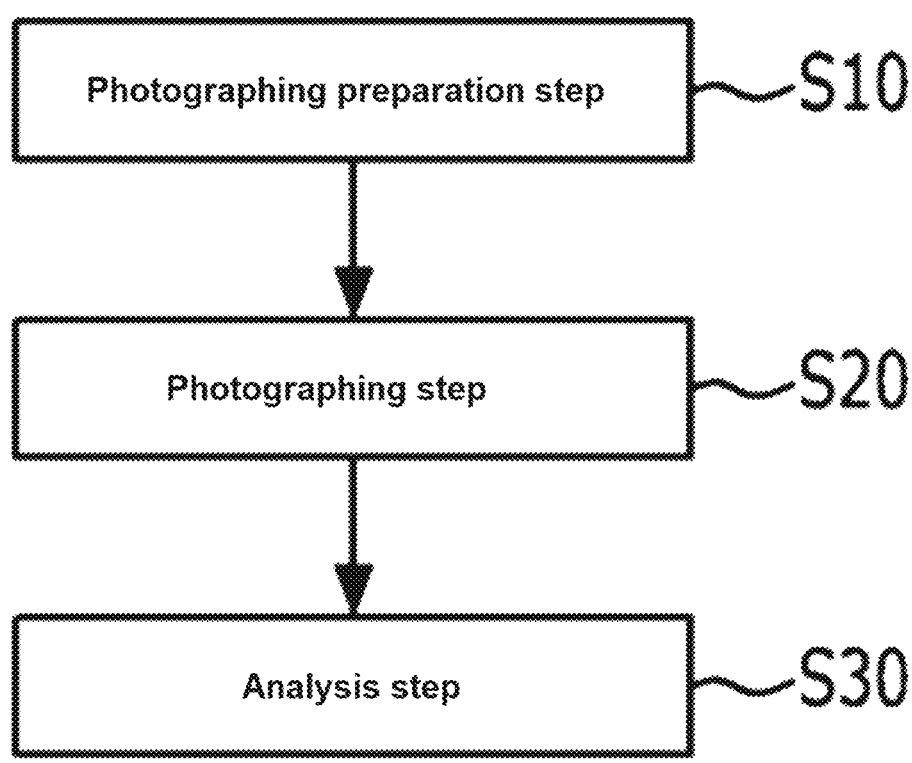

[FIG. 3]
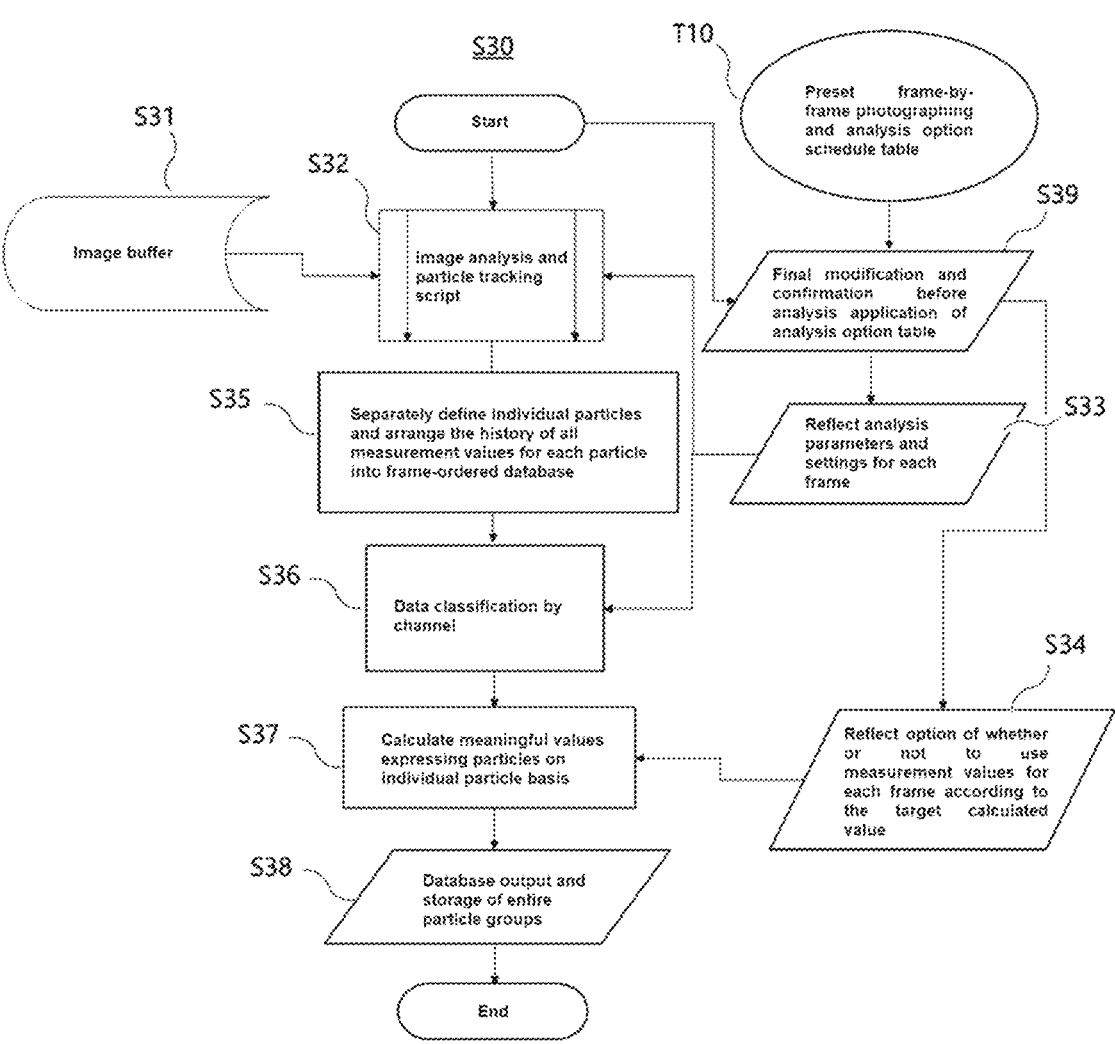

[FIG. 4]
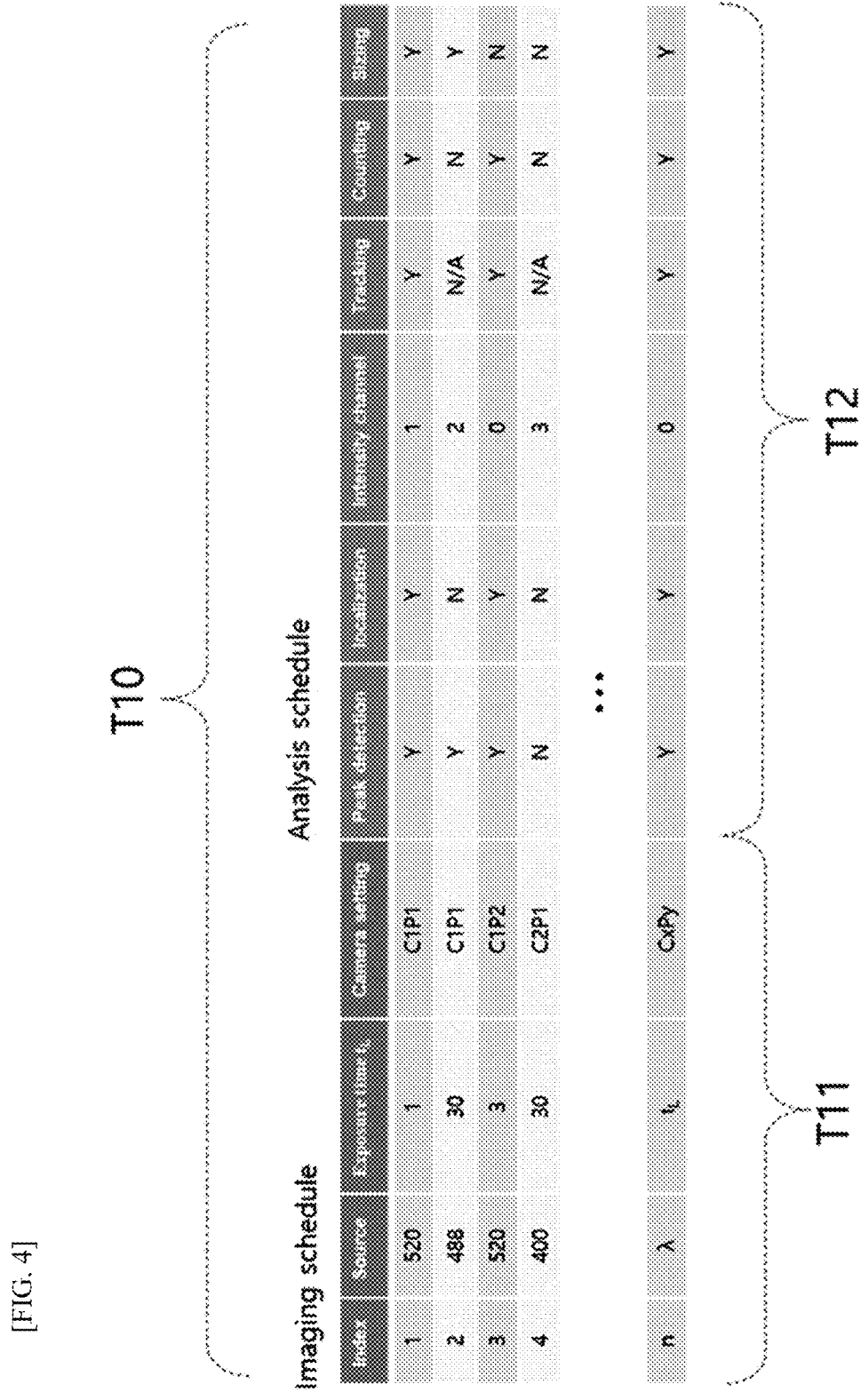

[FIG. 5]
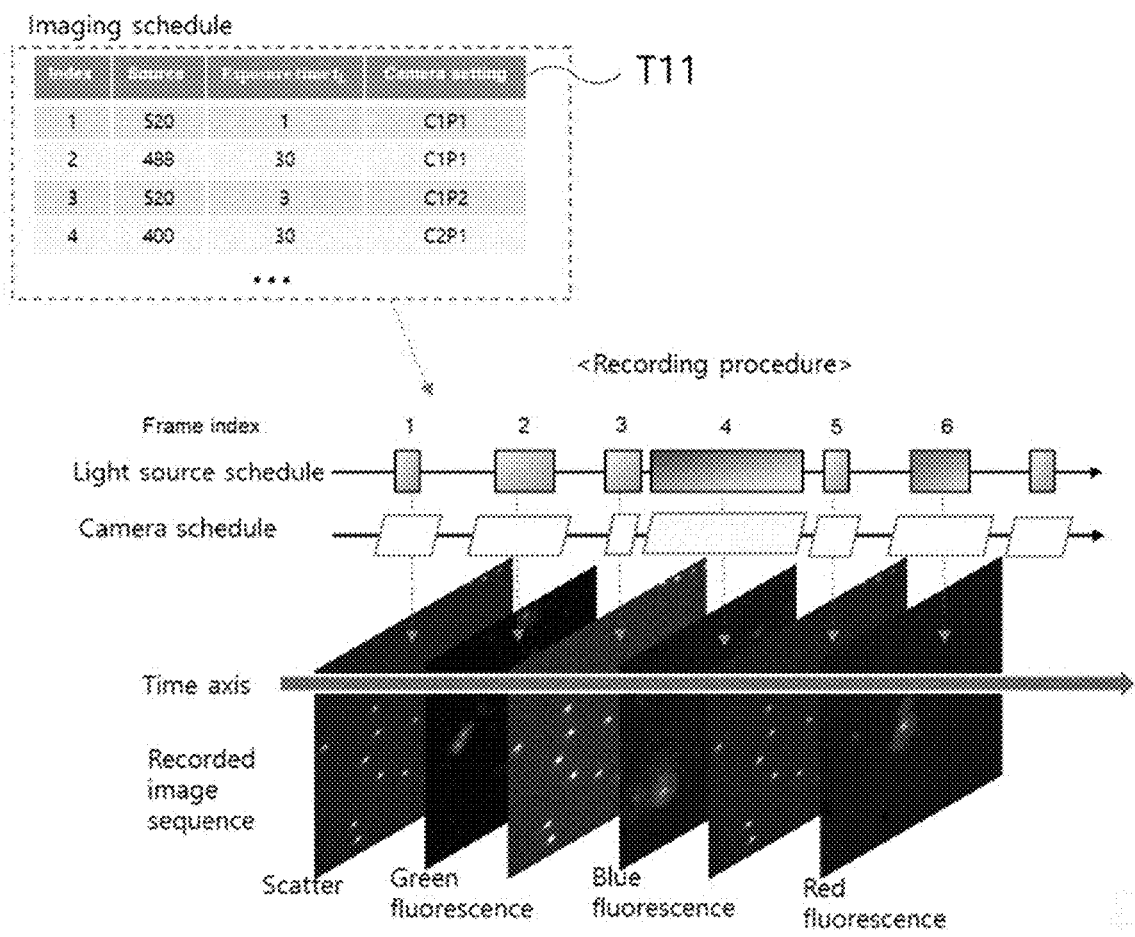

[FIG. 6]
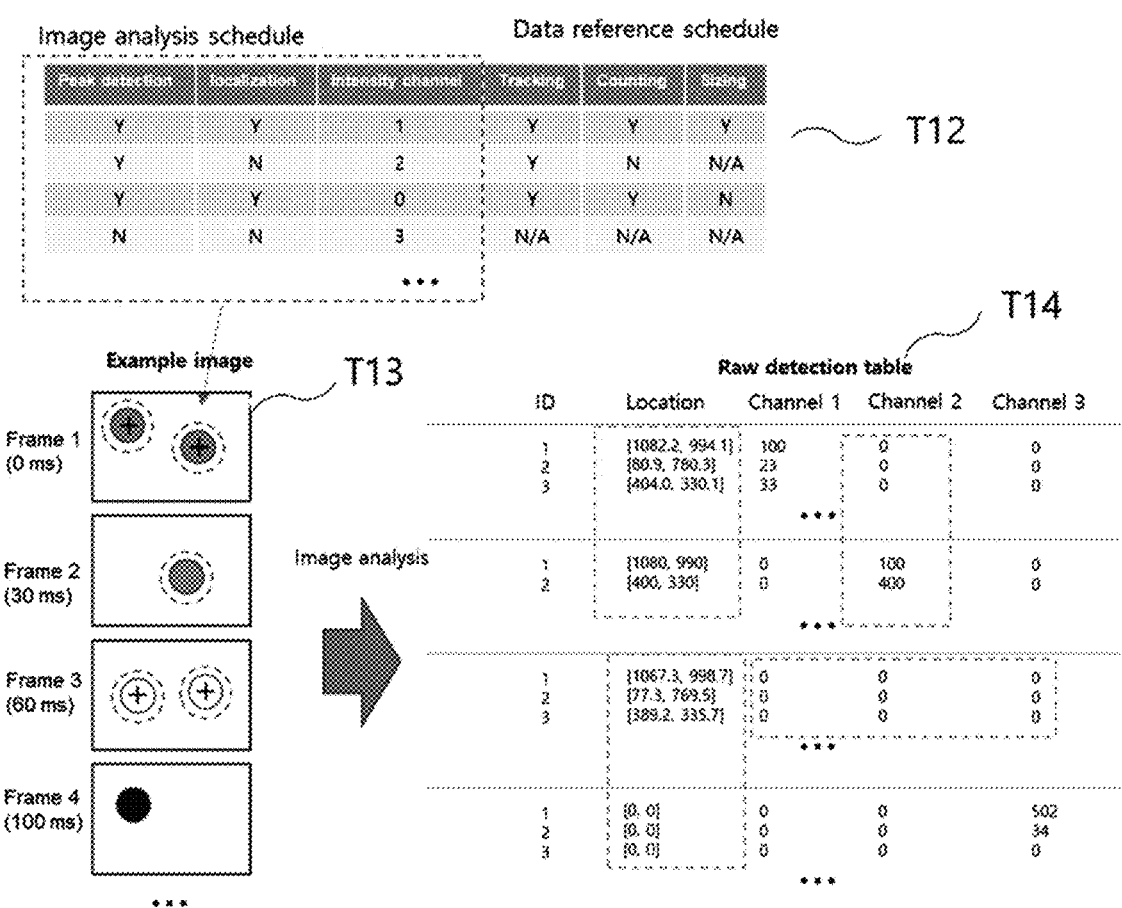

[FIG. 7]
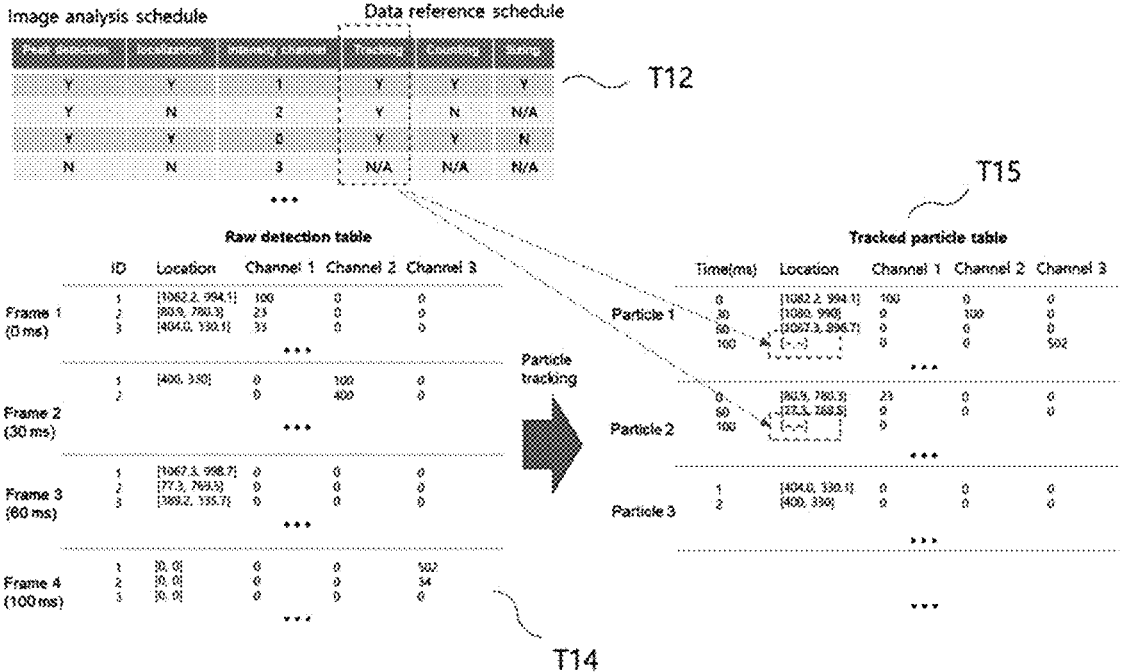
[FIG. 8]
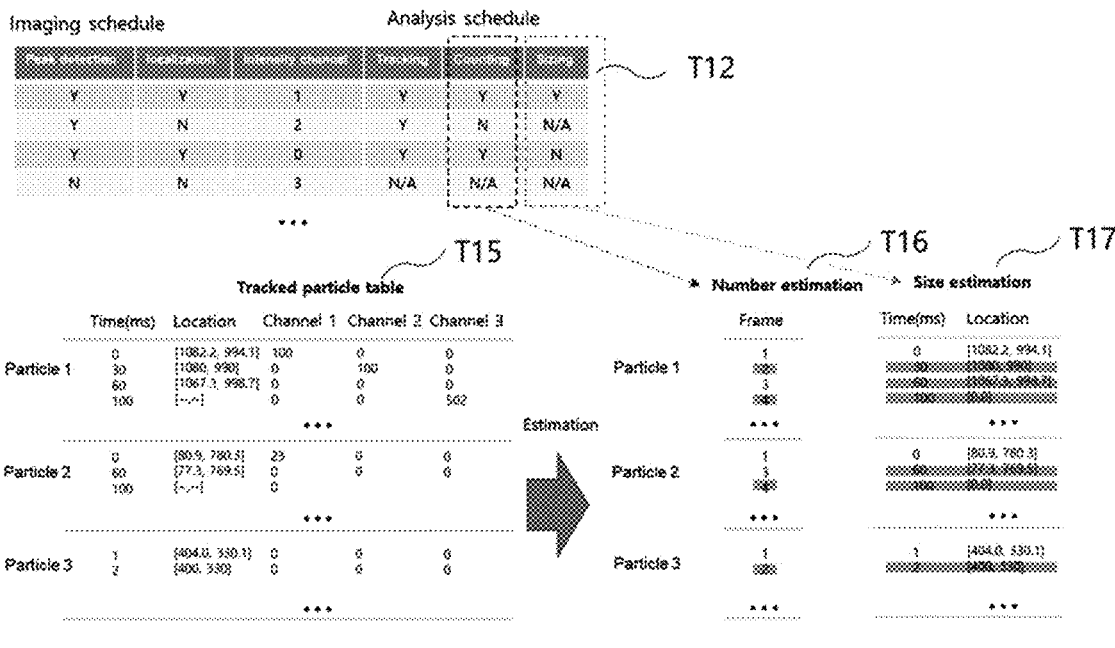

[FIG. 9]
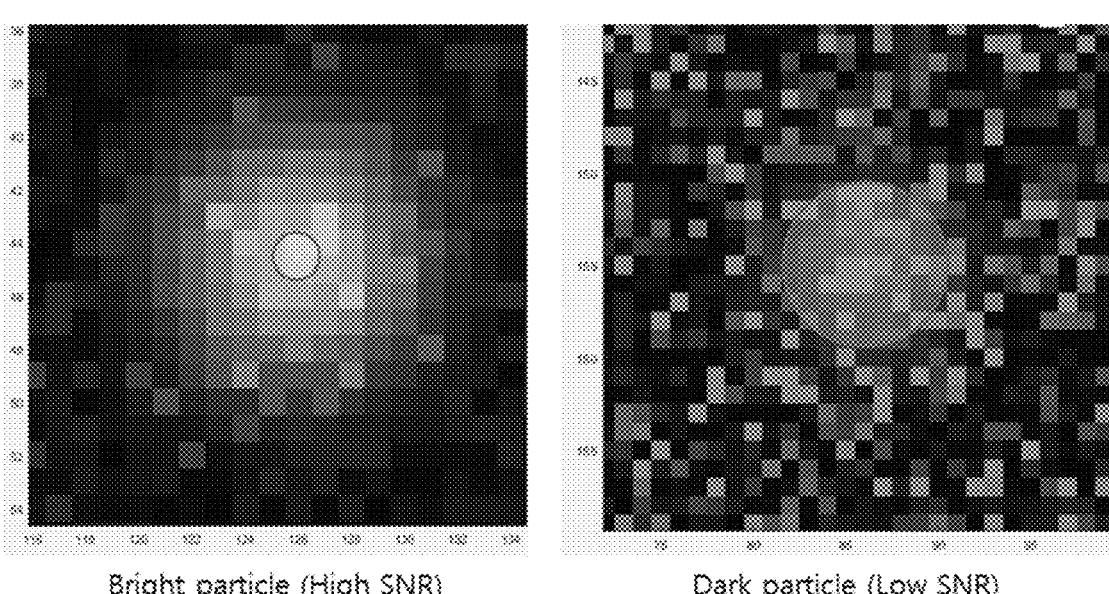
Bright particle (High SNR)          Dark particle (Low SNR)

[FIG. 10]

ANALYSIS METHOD AND ANALYSIS SYSTEM OF PARTICLES THROUGH OPTICAL OBSERVATION

TECHNICAL FIELD

The present invention relates to a particle analysis method and analysis system for analyzing individual particle characteristic values with high accuracy through optical observation.

BACKGROUND ART

When light of various wavelengths is illuminated on individual particles, various scattered light and fluorescence signals of the particles are generated, and images due to these signals are obtained continuously, making it possible to analyze various physical and biochemical properties of the individual particles.

A general optical individual particle analysis method must be preceded by a process of attaching the particles to be analyzed to the floor. In this case, an unknown variable called the adhesion ability of each of the particles to the floor is added during the analysis process. Due to the above unknown variable, accurate quantitative analysis of the number of particles contained in a specific group becomes difficult. Therefore, in order to obtain a more accurate value, there is no choice but to set up another control group and indirectly estimate the result value of the particles through relative comparison for the result value of the control group.

There is a particle tracking method as a representative individual particle analysis method that optically quantifies the size and number of particles without a control group. The particle tracking method continuously photographs floating particles, traces their movement path through verification of the inter-frame identity of individual particles found in each image frame, and connects and handles particles judged to be identical in the order in which they were photographed.

The particle tracking method is affected by the size of the particles to be analyzed. All floating particles are undergoing Brownian motion. The particle tracking method obtains the diameter of the particles through the Stokes-Einstein formula by measuring the degree of this Brownian motion according to the flow of time. However, since Brownian motion is unpredictable and inversely proportional to the size of the particles, when the particle becomes smaller in a situation where nanoparticles with a diameter of 1,000 nm or less must be tracked on consecutive images, Brownian motion becomes larger so that technical difficulties arise in implementing the particle tracking method.

In order for the particle tracking method to be properly implemented and accurately measure smaller particles, the selection of optimal photographing conditions must precede. What should be considered first is that one of the physical quantities that has the greatest impact on the hit rate of the particle tracking method may be the number of photons entering each image pixel. Since the signal-to-noise ratio (SNR) is low when the photons are insufficient, the positional accuracy of the particles is reduced or the presence itself of the particles cannot be noticed. When positional accuracy decreases in this way, the accuracy of particle size measurement decreases, and as a result, if the particles are not recognized on the screen, the quantity of the particles may be misjudged. In particular, when targeting fluorescently marked particles in the medical or bio fields, it is common for long exposure times to be forced due to the fact that fluorescence has very few photons compared to scattered light. At this time, even if a sufficient amount of photons is received, the precision of particle position is reduced again due to motion blur that occurs during a long exposure time.

Meanwhile, the accuracy and reliability of particle characteristic values that can be obtained from particle tracking vary depending on various photographing conditions as described above. Additionally, in order to maximize reliability on a given image, analysis parameters also vary depending on photographing conditions. At this time, the analysis becomes more difficult if one image sequence is not photographed under the same photographing conditions, but images with various photographing conditions are arranged continuously in time series.

Conventionally, various technical approach methods have been proposed to optically analyze particles.

Patent Document 1 discloses a particle tracking analysis method using scattered light. The method discloses analysis using a particle tracking (PTA) method through image analysis of scattered light after irradiating a laser to a suspension in which nanoparticles are dispersed. However, such a method measures only scattered light and cannot achieve accurate particle analysis due to lack of recognition of the photons mentioned above.

To complement this, the technology presented in Patent Document 2 presents particle analysis through particle trajectory analysis according to the Brownian motion of nanoparticles by applying one scattered light source and one fluorescent light source as light sources to the light source sequence table. This method has the advantage of being able to simultaneously perform individual analysis on all particles appearing in the image information rather than on specific particles. However, since photographing is performed under various photographing conditions according to the light source sequence table, the accuracy and reliability of particle characteristic values according to above-mentioned photographing conditions cannot be sufficiently secured.

(Patent Document 1) Korean Patent Publication No. 10-2016-0138143 (published on Dec. 2, 2016)

(Patent Document 2) Korean Patent Publication No. 10-2017-0128123 (published on May 31, 2019)

DISCLOSURE

Technical Problem

In order to solve various mistake and error problems that occur in existing particle tracking analysis methods, the research of the present invention was conducted with the idea that the particle tracking analysis method could derive correct results if continuous photographing was performed to increase the number of photons entering per image pixel, images were continuously arranged in time series, the algorithm and environmental variables applied during the photographing were defined in advance, and valid measurement values to be used per each step are performed, and the analysis method's operating behavior was varied per each frame.

As a result, particles were recognized from the images by photographing images under different photographing conditions for each frame, and errors and mistakes that might occur in the inferred characteristic values of the particles were minimized and precision could be maximized by setting the measurement values to be obtained for each image differently.

Accordingly, an object of the present invention is to provide an analysis method and analysis system of particles through optical observation for analyzing individual particle characteristic values with high accuracy through optical observation.

Technical Solution

As a means of solving the problem, a particle analysis system according to the present invention includes:

a sample receiving unit into which particles to be analyzed are injected;

a sample holder on which the sample receiving unit is put;

a light source unit provided with one or more light sources to irradiate light to the sample receiving unit;

a photographing unit for obtaining consecutive image frames after light irradiation by the light source unit;

a control unit for controlling the wavelength and brightness of light output from the light source unit; and an analysis means for analyzing individual particles by analyzing image information obtained through the photographing unit;

The analysis means includes:

an input device capable of receiving commands of a user;

a user interface for translating a frame-by-frame schedule table including photographing conditions and analysis options intended by the user for each frame of an image to be photographed into a form that is capable of being recognized by other devices;

a memory storing a frame-by-frame schedule table including a photographing option schedule table and an analysis option schedule table;

a device interface for communicating with the photographing unit and the control unit; and a processing processor that performs analysis processing on the image information provided from the photographing unit.

At this time, the processing processor includes:

an image processing unit for generating raw observation data by specifying the position and brightness of particles;

a trajectory tracking unit for tracking the movement trajectory of a particle according to time changes and comparing the tracked movement trajectory of the particle with other particle on the frame photographed through the raw observation data to verify the identity; and a trajectory analysis unit for converting representative characteristic values for each particle from the trajectory data provided by the trajectory tracking unit into values having a unit system of a graph, table, or numerical value;

The photographing unit includes one or more cameras.

When the photographing unit is provided with two or more cameras, the cameras may be implemented so that at least one of type of the camera, wavelength of incident light, spacing between sensor pixels, total number of pixels, magnification of the image projected on the imaging surface, and preset binning of the sensor does not match, and the cameras may each have a separate photographing option schedule table.

Furthermore, a particle analysis method according to the present invention includes:

a photographing preparation step (A) of holding a particle sample to be analyzed on a sample holder and then inputting a photographing option schedule table and an analysis option schedule table into an input device of a user interface;

a photographing step (B) of calling a light source according to the photographing option schedule table and then controlling the photographing time to obtain consecutive image frames; and an analysis step (C) of analyzing the characteristics of individual and entire particles according to the analysis option schedule table from the consecutive image frames obtained in the photographing step;

The analysis step (C) includes steps of:

selecting an analysis option schedule table including an algorithm and analysis factors used for analysis for each frame of consecutive images;

applying the analysis option schedule table to an image analysis and particle tracking script;

obtaining raw observation data through image analysis by applying analysis functions and parameters to each image frame previously photographed by the script;

executing a particle tracking process from the raw observation data to obtain individual particle tracking data by grouping cases considered to be the same particle; and obtaining information on all particles by collecting the obtained individual particle tracking data;

In the photographing option schedule table, when the photographing unit is provided with two or more cameras, a correction function and correction value are input to obtain consistent data by offsetting differences in device performance and environmental variables between cameras.

Photographing is performed until the remaining number of photographing is filled by returning to the beginning when a command is received to take more images than those of the photographing option schedule table and repeating the same schedule.

The analysis option schedule table is continuously entered so that the function to be used in each step of the script, the input value of the function, and the output of the function is capable of being applied differently to each image frame.

The analysis option schedule table includes environment variables that specify for each frame which values of the intermediate output values generated during the process of proceeding the above series of scripts are used as input data when calling a specific function throughout the analysis process belonging to a specific step of the series of scripts or at any time point.

The analysis option schedule table includes an additional command consisting of a bundle of a step to be executed, a handle of a function to be executed, a name of a value to be derived, and a list of frames to be used in the function, and an additional command column in which a number of additional commands are recorded.

The analysis option schedule table is automatically drawn up and arranged through the user interface, optimal behavior and environmental variables are automatically arranged by detecting undefined analysis factors, and particle behavior in which measurement is difficult or it is difficult to trust the results, and different algorithms are applied partially or entirely depending on the analysis option.

Even if the series of scripts use different functions and algorithms for each step, data with a consistent structure necessary for the next step to be executed desirably are generated in each step, and if the structure is not satisfied depending on the implementation type of the function, a mark requesting exception processing is specified in the data, or a table recording the frame requiring exception processing and the name of its value and the exception processing method is included.

The scripts receive the additional command column when referring to the analysis option schedule table, and execute the additional command when the step in which the additional command should be executed matches the current step of the scripts.

The image analysis generates raw observation data by separating particle information including the identification (ID), position, and brightness values of provisional particles derived from the image for each frame into each of the channels based on the analysis option schedule table.

The particle tracking analysis considers the selected pair of particles with the highest probability to be the same particles by selecting the pair of particles with the highest probability considering the shape, brightness, and position of the particles in each frame from the raw observation data, reassigns the same particle ID to a bundle of the measurement values of provisional particles considered to be the same particles, and connects measurement values for particles with the same ID to generate particle tracking data for each particle.

The information on all particles is to simultaneously obtain one or more selected from particle size, particle number, particle concentration, Brownian motion trajectory, and the result value of the additional command.

Advantageous Effects

The method according to the present invention and the system for implementing the same can measure the analysis and derivation of mathematical, physical, and biochemical properties with high accuracy through spatial and optical information of floating particles that are the measurement object.

Specifically, the algorithm applied and environmental variables, and valid measurement values and intermediate calculation values that would be used at each step were defined in advance, particles were recognized from the images by photographing the images under different photographing conditions for each frame of images, and the behavior of operating the analysis method was varied for each frame so that it was possible to minimize errors and mistakes that may occur in characteristic values obtained through the particle tracking analysis method and maximize precision. Such method and system can solve various mistake and error problems that occur in the existing particle tracking analysis methods.

The analysis system has a schedule table for each frame including a photographing option schedule table and an analysis option schedule table within the analysis means, can receive commands to set or exclude measurement values from a plurality of specific images to arbitrary values through the user interface unit. Through this, it can prevent misjudgment of particle concentration or position in the next image by arbitrarily setting the measurement values, or select and exclude measurement values that may reduce the accuracy of the brightness of each fluorescence/scattered light of the particles and the size of the particles.

In addition, it is possible to reduce analysis requirement time by omitting calculations to obtain unnecessary measurement values during the analysis process or applying other algorithms that can increase the precision and calculation speed of other measurement values while sacrificing accuracy for unnecessary measurement values.

In addition, the method and system according to the present invention can read the presence or absence of two or more different fluorescent substances in individual particles observed through a particle observation and analysis system, and enable simultaneous quantitative analysis for all particles observed on the images. At this time, the proportion of the relevant particles occupied in total particles can be known by inversely calculating the probability that particles having a specific fluorescent substance appear in the entire photographed image through the information on the presence or absence of fluorescent substances of individual particles collected, and when a large number of particles having a specific fluorescent substance form a small group, such a proportion can be added up to quantify how many particles belonging to the particle group exist per unit volume. At this time, the quantity of particles having a specific fluorescent substance can be measured more accurately by applying the analysis option schedule table.

In addition, the size of the relevant particles can be measured from the trajectory of the particles tracked through time-series repeated photographing, and it is possible to analyze various physical properties of the relevant particles associated with each external force by tracking and analyzing the changes in changing trajectories of individual particles when external force is applied by applying electrophoresis, dielectric phoresies, thermophoresis, and vibration to the particle sample to be analyzed through additional commands.

BRIEF DESCRIPTION OF DRAWINGS

FIG. 1 is a schematic configuration diagram of a particle analysis apparatus according to an embodiment of the present invention.

FIG. 2 is a flow chart schematically showing the overall flow of the analysis process of the present invention.

FIG. 3 is a flow chart applied to a series of particle analysis processes performed in the analysis step S30 with the consecutive images and frame-by-frame schedule table T10 acquired in the photographing step S20.

FIG. 4 is an example of a frame-by-frame schedule table T10 including a photographing option schedule table T11 and an analysis option schedule table T12.

FIG. 5 is an example of a series of photographing performance processes performed by the control unit 102 in the order designated in the photographing option schedule table T11 in the photographing step S20.

FIG. 6 shows analysis options reflected when analyzing example image information T13 frame by frame in the image analysis step S32, and is an example of raw observation data T14 in which those extracted from the analysis option schedule table T12 of FIG. 4 and the relevant analysis options are reflected FIG. 7 is an example of the items of the analysis option schedule table T12 reflected when performing the particle tracking method with the raw observation data T14 of FIG. 6 and the particle tracking data T15 that is the result of performing the relevant tracking method FIG. 8 is an example of displaying the items of the analysis option schedule table T12 reflected in the process of creating the carefully selected data tables T16 and T17 used to derive the final output value from the particle tracking data T15 of FIG. 6, and values on particle tracking data T15 that are handled as valid or invalid in the calculation process when the respective options are reflected.

FIG. 9 is an excerpt image to contrast whether the images of particles found in different frames have different signalto-noise ratios, and an image marking the error range of the particle coordinates output as a result during the actual analysis process.

FIG. 10 is an example diagram comparing the difference between pictures showing the particle measurement events reflected in the calculation process in a time series and the resultingly calculated particle count values when the analysis option of the present technology is used and when it is not used.

BEST MODE

The present invention relates to a particle analysis system including:
  a sample receiving unit into which particles to be analyzed are injected;
  a sample holder on which the sample receiving unit is put;
  a light source unit provided with one or more light sources to irradiate light to the sample receiving unit;
  a photographing unit for obtaining consecutive image frames after light irradiation by the light source unit;
  a control unit for controlling the wavelength and brightness of light output from the light source unit; and
  an analysis means for analyzing individual particles by analyzing image information obtained through the photographing unit;
  The analysis means includes:
  an input device capable of receiving commands of a user;
  a user interface for translating a frame-by-frame schedule table including photographing conditions and analysis options intended by the user for each frame of an image to be photographed into a form that is capable of being recognized by other devices;
  a memory storing a frame-by-frame schedule table including a photographing option schedule table and an analysis option schedule table;
  a device interface for communicating with the photographing unit and the control unit; and
  a processing processor that performs analysis processing on the image information provided from the photographing unit.
  At this time, the processing processor includes:
  an image processing unit for generating raw observation data by specifying the position and brightness of particles;
  a trajectory tracking unit for tracking the movement trajectory of a particle according to time changes and comparing the tracked movement trajectory of the particle with other particle on the frame photographed through the raw observation data to verify the identity; and
  a trajectory analysis unit for converting representative characteristic values for each particle from the trajectory data provided by the trajectory tracking unit into values having a unit system of a graph, table, or numerical value;
  In addition, the present invention relates to a particle analysis method including:
  a photographing preparation step (A) of holding a particle sample to be analyzed on a sample holder and then inputting a photographing option schedule table and an analysis option schedule table into an input device of a user interface;
  a photographing step (B) of calling a light source according to the photographing option schedule table and then controlling the photographing time to obtain consecutive image frames; and an analysis step (C) of analyzing the characteristics of individual and entire particles according to the analysis option schedule table from the consecutive image frames obtained in the photographing step;
  The analysis step (C) includes steps of:
  selecting an analysis option schedule table including an algorithm and analysis factors used for analysis for each frame of consecutive images;
  applying the analysis option schedule table to an image analysis and particle tracking script;
  obtaining raw observation data through image analysis by applying analysis functions and parameters to each image frame previously photographed by the script;
  executing a particle tracking process from the raw observation data to obtain individual particle tracking data by grouping cases considered to be the same particle; and
  obtaining information on all particles by collecting the obtained individual particle tracking data;

MODE FOR INVENTION

The terminology used herein is only intended to refer to specific embodiments and is not intended to limit the present invention. Singular forms used herein include plural forms also unless phrases clearly indicate the contrary. The meaning of "comprising" used in the specification specifies a specific characteristic, region, integer, step, operation, element and/or component, and does not exclude the existence or addition of another specific characteristic, region, integer, step, operation, element, component and/or group.

Although not defined differently, all terms including technical and scientific terms used herein have the same meaning as those generally understood by those skilled in the art to which the present invention pertains. Terms defined in commonly used dictionaries are further interpreted as having meanings consistent with related technical literature and currently disclosed content, and are not interpreted in ideal or very formal meanings unless defined.

Hereinafter, embodiments of the present invention will be described in detail so that those skilled in the art to which the present invention pertains can easily implement the present invention with reference to the accompanying drawings. However, it should be noted that the present invention can be implemented in various different forms and is not limited to the embodiments described herein.

FIG. 1 is a schematic configuration diagram schematically showing a particle analysis apparatus according to an embodiment of the present invention.

Referring to FIG. 1, a particle analysis system 100 for optical observation and analysis of particles according to an embodiment of the present invention includes: a sample receiving unit 130 into which particles to be analyzed are injected; a sample holder 103 on which the sample receiving unit 130 is held; a light source unit 101 provided with one or more light sources to irradiate light to the sample receiving unit 130; a photographing unit 105 for obtaining consecutive image frames after irradiation of light by the light source unit 101; a control unit 102 for controlling the wavelength and brightness of light output from the light source unit 105; and an analysis means 106 for analyzing individual particles by analyzing image information obtained through the photographing unit 105; The present invention is not implemented by being limited to the components illustrated above, and may further include other components as needed.

The configuration of the particle analysis system 100 will be described in more detail.

The light source unit 101 includes one or more light sources 110 that irradiate light toward a particle sample. The light source 110 is configured to be turned on/off by an external electrical signal, and to change the color of light irradiated toward the sample holder 103 under the control of the control unit 102. The light source 110 may be, for example, a light emitting diode or a laser generator with fast response that is turned on or off within 0.05 seconds.

A light guide 112 may be installed on the optical path between the light source 110 and the sample holder 103 so that one or more light sources 110 irradiate light to the same point. The light guide 112 may be configured to modify or correct the optical path into a desired form depending on the position of the sample holder 103 or the particle sample. For example, it may be a mirror, a prism, a dichroic mirror, or the like.

A method of flexibly connecting the light guide 112 and the sample holder 103 using an optical fiber so that the optical path can be modified or corrected into a desired form depending on the position of the sample holder 103 or the particle sample may be considered. Of course, it is not limited thereto.

The light source unit 101 may further include a light concentrating means 114 that increases the intensity of light passing through the light guide 112 to irradiate it toward the sample holder, and the light concentrating means 114 may be a convex lens.

When using a light source 110 in which turn on or turn off is not implemented in a short time (within 0.05 seconds), a method of controlling the light source 110 to reach or not reach the target point through a motor-mounted corrective device may be considered. The entire light source unit 101 can be replaced with a monochromator that guarantees a fast response speed enough to change the wavelength within 0.05 seconds.

The sample holder 103 is configured to accommodate a particle sample P to be analyzed and to allow light of the light source unit 101 to transmit to be irradiated to the particle sample. The sample holder 103 preferably accommodates a particle sample in a fluid channel (omission of the reference numeral) of the inside. At this time, it includes a sample receiving unit 130 manufactured of a transparent material such as quartz, glass, polydimethylsiloxane (PDMS), etc. so that light of the light source 110 can transmit to be irradiated to the particle sample.

The sample holder 103 may also include a pump 132 that applies a constant pressure or flow rate so that the particle sample moves at a constant flow rate within the fluid channel within the sample receiving unit 130. Further, it may include a stage (not shown) on which the sample receiving unit 130 is mounted and which has a mechanism or mechanical structure that can be operated manually and electronically to arbitrarily adjust the position of the sample receiving unit 130 with respect to the light source unit 101.

Light irradiated from the light source 110 and reflected from the particle sample P may be provided to the photographing unit 105 through the imaging optical system 104 in the middle. The imaging optical system 104 preferably includes an objective lens 140 through which light reflected by the particle sample is incident to create an enlarged image, and a mirror 142 guiding so that light passing through the objective lens 140 forms an image at the correct position of the photographing unit 105.

The mirror may be changed or replaced with a dichroic mirror depending on the cases, and an optical filter (not shown) that blocks specific wavelengths may be added. The optical filter is not shown, but may be disposed on the optical path between the mirror constituting the imaging optical system 104 and the camera constituting the photographing unit 105, between the objective lens 140 and the mirror 142, or between the objective lens 140 and the sample holder 103.

The photographing unit 105 acquires image information necessary for analyzing the physical properties of the particle sample from light reflected from the particle sample P and incident through the imaging optical system 104. Such a photographing unit 105 may preferably include a camera capable of acquiring continuous image information at a rate of one frame or more per second and a recording means for storing image information acquired through the camera. In addition, the photographing unit 105 may include one or more cameras, and in order to implement this, two or more mirrors 142 may be arranged to form images on cameras located at different positions, the images of transmitted and reflected light are divided with a dichroic mirror, or the position and angle of the mirror in accordance with the photographing timing can be sequentially adjusted using a motor.

Preferably, the photographing unit 105 is provided with one or more cameras, and when it is provided with two or more cameras, one or more of the photographing factors of two or more types of the cameras that are the same as or different from each other may not match each other. Here, the photographing factors refer to a collection of photographing parameters and environmental variables defined by the spacing between sensor pixels, the total number of pixels, the magnification of the image projected on the imaging surface, and the binning of the preset sensor, and at this time, the photographing unit 105 preferably includes a photographing option schedule table T11 in which a correction function that must be performed to obtain consistent data when one or more photographing factors do not match, and a correction value thereof are input, includes a plurality of photographing option schedule tables separated for each camera depending on the cases, and photographing is performed based on them.

The main function of the control unit 102 is to control the wavelength and brightness of light output by the light source 110 and to issue commands to the photographing unit 105 to acquire image information. The control unit 102 preferably determines a control value corresponding to a command input through the analysis means 106, converts the wavelength and brightness of light output from the light source 110 with the determined control value over time, and applies a photographing command to the photographing unit 105 whenever the conversion is completed.

The control unit 102 includes a conducting wire L1 that applies a signal to open and close the camera shutter of the photographing unit 105, and a conducting wire L2 that can control the turn on or turn off of the light source 110 to each light source 110 element. Each of the conducting wires L1 and L2 can output two or more signals and can be connected to an FPGA board in which a program can be built-in. At this time, the IC chip can be replaced with a board or chip mounted on the computer's PCI port or a position similar thereto.

The control unit 102 also includes a device interface that can be controlled by the analysis means 106, for example a computer. Accordingly, the command input through the analysis means 106 and the photographing option schedule table T11 for each frame are transmitted to the control unit 102 through the interface, and the control unit 102 controls the light source 110 and the camera shutter operation by sending control signals to each of the light source unit 101 and the photographing unit 105 through the relevant conducting wire as a control value corresponding to the input command. That is, the control unit 102 controls the call and exposure time of the light source and the operation time of the photographing unit 105 by the photographing option schedule table T11 in the analysis means 106.

The analysis means 106 collects image information obtained through the photographing unit 105 and analyzes the mathematical, physical, and biochemical properties of individual particles constituting the particle sample from the collected image information.

The analysis means 106 includes: an input device capable of receiving commands of a user; a user interface for translating the frame-by-frame schedule table T10, which includes the user's intended photographing conditions and analysis options for each frame of the image to be photographed, into a form that is capable of being recognized by other devices; a memory storing the frame-by-frame schedule table including a photographing option schedule table and an analysis option schedule table; a device interface for communicating with the photographing unit 105 and the control unit 102; and a processing processor that performs analysis on the image information provided from the photographing unit 105.

The processor may include multiple processing units to assign roles for accurate and efficient analysis and processing of image information. Preferably, the plurality of processing units include: an image processing unit 160 for generating raw observation data by specifying the position and brightness of particles; a trajectory tracking unit 162 that performs identity verification between particles at different times through the raw observation data T14 and tracks the movement trajectory of the particles with respect to time changes; and a trajectory analysis unit 164 for converting the representative characteristic values of each particle from the trajectory data provided by the trajectory tracking unit 162 into graphs, numerical values and tables having a unit system that can be compared with graphs or other measuring equipment or officially recognized.

Specifically, the image processing unit 160 plays a role in specifying and recording optical information (raw observation data) T14 such as the positions, brightness, and shape of points estimated to be particles on image information (successive image frames) T13 photographed under the control of the control unit 102 according to the above-mentioned photographing option schedule table T11.

In this process, analysis options deemed necessary for use are extracted from the analysis option schedule table T12 by comparing used places designated in the schedule table and the current analysis step, and the image analysis method to be applied to each individual frame, the parameters necessary for the correct operation of the analysis algorithm, and the type of raw observation data T14 to be obtained are designated from the extracted analysis options to generate different combinations of raw observation data T14 through different processes between the respective frames. Here, "used places" are string data that specifies what result value the relevant option is used to obtain, specifies the analysis step to be applied, or includes both.

More specifically, options in which the recalling time and the use time that is designated on the schedule table are matched after recalling the schedule table from memory are selectively extracted, it is performed in common to obtain a vector in which the lists of parameters to be applied to handles of functions and analysis options according to the frame order are arranged, and depending on the actual algorithm implementation method, the function and analysis parameters to be applied to a specific frame are selected, and then the analysis is repeatedly performed in frame order. Alternatively, as the other method, frames in which the order pairs of the functions and analysis parameters are all the same are classified, and then the analysis is repeated as many as the number of independent order pairs so that raw observation data can be generated in such a manner that the frames are processed in a bundle unit.

When there are two or more image analysis methods mounted on the image processing unit 160, they are not limited to the designatable options expressed in the analysis option schedule table T12 of FIG. 4, additional option rows are provided on the analysis means 106, or the image processing unit 160 may receive analysis options specified as a combination of function/input value/output value.

When the channels with which the observation values are to be replaced are designated differently for each frame from the analysis option schedule table T12 after generating the raw observation data T14, a target channel is designated for each frame, and values of specific types are separately accepted in the region of data allocated for the relevant channel. Whether or not values of the above-mentioned specific types are subject to separate acceptance is designated by an algorithm or designated by the analysis option schedule table T12. In order to prevent overload problems that occur during the high-capacity image processing process, the processing time may be adjusted so that the separate acceptance of observation values for each channel is achieved during the subsequent series of analysis processes rather than immediately after generating the raw observation data T14.

The trajectory tracking unit 162 verifies identity by comparing the position of each particle with those of particles on other frames taken at a nearby time using the raw observation data T14 listed in frame order. If necessary, the identity is verified by recalling the original image T12 or a portion thereof. Particles that are considered identical are connected to each other to track the movement trajectory of the particle for each frame according to the flow of time is tracked, and the associated raw observation data T14 are also written side-by-side with the trajectory value to return particle tracking data T15.

Whether the current frame is designated as the tracking target in the tracking process is checked by referring to the analysis option schedule table T12, and if it is not included in the tracking target, writing side-by-side of the particle trajectory value for each frame as described above is not used, the raw observation data (T14) row of the current target particle is concatenated with the information of the same particle in the nearest frame as a result of the identity verification with the current target particle, and the current target particle is excluded from the future tracking process so that it is not referenced until all tracking processes are completed. When the trajectory tracking unit 162 is mounted with multiple tracking methods, the trajectory tracking unit 162 may receive input as to which tracking method to apply to the relevant frame without being limited to whether or not a specific frame is designated in a tracking target.

In addition, the trajectory analysis unit 164 converts the trajectory data T15 provided by the trajectory tracking unit 162 into a mathematically, physically, and biochemically meaningful value (derived value for each particle). Here, the meaningful value means a value in an arbitrary unit that has been scaled to facilitate comparison with measurement results in other similar equipment, or a value whose dimensions are consistent with a generally officially recognized standard unit system. The process of separating and accepting raw observation values for each channel described above should be completed before this time point. Specifically in the conversion process, derivation factors are extracted from the analysis option schedule table T12, where the derivation factors refer to an array containing a derived value requested by the user and a frame list designated to be used in the process of deriving the relevant value, a carefully selected data table T16 is created that collects only the measurement values necessary for the derivation process after omitting the part excluding the trajectory data from the "use-designated frame" specified in the derivation factor for each individual particle, and derived values are obtained by referring to the carefully selected data table for each particle, and then an array of derived values having a length corresponding to the number of valid particles is obtained.

If two or more types of derived values need to be output, the conversion process may be replaced by, after extracting two or more carefully selected data tables T16 and T17 corresponding to each derivation factor for each particle, calling the function that calculates the derived value, returning the derived value for each individual particle, sequentially obtaining the desired derived value while the function call is changed, or partially creating the carefully selected table as a single particle unit without being limited to this and completing calculation of two or more derived values, and repeatedly performing the same process for all individual particles.

The calculated derived values of individual particles are converted to values with a universal unit system while expressing the characteristics of each particle, and these are converted into a database so that graphs, tables and values, which effectively expresses the particles that make up the particle sample through statistical methods, are output from the database.

Successive image frames obtained in the photographing unit 105 display particle tracking data T15 containing information on individual particles by the analysis option schedule table T12 in the analysis means 106.

The optical observation and analysis process of particles performed by the above-described optical particle analysis apparatus will be examined in connection with the operation of the particle analysis apparatus.

The program of the control unit 102 has a function controlling the camera through the L1 conducting wire of FIG. 1 and a function controlling the light source through the L2 conducting wire embedded therein, and processing steps according to time of all signals are set based on the time marker using the clock generation chip built in the control unit 102 in order to synchronize the two devices.

FIG. 2 is a flow chart schematically showing the overall flow of the optical observation and analysis process of particles according to another aspect of the present invention.

Referring to FIG. 2, the optical observation and analysis process of particles performed by the above-described optical particle analysis apparatus may be largely divided into three steps.

Specifically, it includes:

a photographing preparation step (A) of holding a particle sample to be analyzed on a sample holder and then inputting a photographing option schedule table and an analysis option schedule table into an input device of a user interface;

a photographing step (B) of calling a light source according to the photographing option schedule table and then controlling the photographing time to obtain consecutive image frames; and an analysis step (C) of analyzing the characteristics of individual and entire particles according to the analysis option schedule table from the consecutive image frames obtained in the photographing step.

Hereinafter, it will be described for each step in detail.

(Step A) Photographing Preparation Step

First, the photographing preparation step S10 is a step of inputting information on how to control the control target unit (light source unit, photographing unit) in accordance with the particle sample to be analyzed, and at this time, a frame-by-frame schedule table T10 is drawn up.

The photographing preparation step S10 may preferably include a process of holding the particle sample to be analyzed on the sample holder (103 in FIG. 1), and drawing up a device operation sequence table containing information on some or all of the calling order and exposure time (light emission time) of the light source, photographing time, and the repetition cycle of photographing option schedule table T11 during photographing, and a process of inputting a photographing command for full-scale optical observation after completion of the drawing up.

FIG. 4 is an example of a frame-by-frame schedule table T10 including a photographing option schedule table T11 and an analysis option schedule table T12.

As shown in the example of FIG. 4, the frame-by-frame schedule table T10 includes a photographing option schedule table T11 and an analysis option schedule table T12, and these are completed up to the time point before the photographing command is issued.

In order to visually schematize the frame-by-frame schedule table T10, the rows are displayed by arranging different frames, the columns are displayed by arranging parameter values to be applied according to the use places of the values, and n rows are designated in the example of FIG. 4. The form of such a frame-by-frame schedule table T10 may allow the rows and columns to be interchanged without being limited to the above description, or may be replaced with a string in which "used places/analysis/relevant frame number" contains a certain delimiter and is one-dimensionally enumerated, a matrix with an unsized composite structure consisting of "a vector of bundling all frame numbers that share used places/parameters/relevant settings", a structure in which the hierarchical structure of "used places-parameters" is enumerated and present as many as the number of frames set, or a structure in which the hierarchical structure of "used places-parameters-all frames sharing the relevant settings" is present as many as combinations of "used places-parameters" different from each other. Here, the parameters are not limited to binary values of Y/N (true/false), or strings and numbers that define the operating environment, but may be replaced by the handle of the function to be used in that relevant used place.

In the photographing option schedule table T11, when the photographing unit is provided with two or more cameras, a correction function and correction value are input to obtain consistent data by compensating for differences in photographing factors.

When a command is received to take more images than the photographing option schedule table T11, photographing is performed until the remaining number of photographing is filled by returning to the beginning and repeating the same schedule.

Functions to be used in each step of the script and the results of the functions are consecutively entered into the analysis option schedule table T12 so that they can be applied differently to each image frame.

The analysis option schedule table T12 contains parameters that designate for each frame which values will be used among the intermediate data generated in the process of performing the above-described series of scripts when calling a specific function throughout the behaviors belonging to a specific step of the above-described series of scripts or in an arbitrary step.

The analysis option schedule table T12 executes additional commands in which the steps to be executed, the handle of the function to be executed, the name of the value to be derived, and the list of frames to be used in the function are entered.

The analysis option schedule table T12 is automatically drawn up and arranged through the user interface, undefined analysis factors and particle behavior where measurement is difficult or the results are unreliable are detected to automatically find the optimal algorithm and analysis parameters, and partially or entirely different analysis algorithms are applied depending on the previously drawn-up analysis options.

The analysis option schedule table T12 is not involved during photographing, but may be referred to in the process of automatically substituting the optimal value when there is a missing part in the photographing option schedule table T11. At this time, the analysis option schedule table T12 may be arbitrarily modified from the time after photographing to the time before performing analysis.

If the total number of frames scheduled to be photographed in the image is greater than the number of frames in the photographing option schedule table T11, the frame schedule may be set to photograph all registered frames and then return to the first frame to repeat photographing. In addition, values that indicate how many seconds photographing is performed at most through the user interface within the analysis system or how many cycles the photographing option schedule table T11 is repeated may be inputted from the user.

(Step B) Photographing Step

According to the photographing command input at the finishing time point of the photographing preparation step S10 in the photographing step S20, light sources are called in the order designated in the photographing option schedule table T11 and an operation command is applied. Accordingly, the photographing time is controlled as long as the exposure time of the called light sources to prevent the combination of light sources from being mixed between frames so that an exclusive combination of light sources is used within one frame, and image information in which individual particles appear to be distinguishably separated from each other is obtained, and the obtained image information is stored.

FIG. 5 is an example of a series of photographing performance processes performed by the control unit 102 in the order designated in the photographing option schedule table T11 in the photographing step S20.

In FIG. 5, the first column of the photographing option schedule table T11 is the turn, and the photographing processes are performed according to the relevant turn. Since the turn is the number of frames if the total number of turns is equal to the total number of frames to be photographed, but the control unit returns to No. 1 row of the photographing option schedule table T11 to repeat the same process if the total number of frames to be photographed is more than the turn, the relevant turn only indicates which frame row is referenced within one schedule cycle.

The second column of the photographing option schedule table T11 defines which light source will be used.

Two or more light sources may be set to be used in one frame without being limited to the example in FIG. 5. The third column sets the time to turn on the light source. The fourth column is a section of collecting detailed set values of the camera, and this section includes various parameters and environmental variables essential for camera operation, such as the type of camera to be used, shutter opening time, and gain. Further, as shown in 5, various photographing options are applied to each frame, and during actual photographing, each frame is subjected to repeated photographing while following different light sources and photographing conditions.

(Step C) Analysis Step

In the analysis step S30, a process is conducted to analyze and derive image information about the sample particles acquired in the above-described photographing step S20, that is, spatial and optical information of individual particles according to the method defined in the analysis option schedule table T12 from the consecutive image frames S31 into physical and biochemical information.

Specifically, the analysis step C is performed by including steps of:

selecting an analysis option schedule table T12 including the algorithm and analysis factors used for analysis for each frame of consecutive images;

applying the analysis option schedule table T12 to an image analysis and particle tracking script;

obtaining raw observation data T14 through image analysis by applying analysis functions and parameters to each image frame previously photographed by the script;

generating individual particle tracking data T15 only when particles are considered to be the same particles by executing a particle tracking process from the raw observation data T14; and obtaining information on all particles from the obtained individual particle tracking data T15.

This analysis step S30 may be explained in more detail with reference to FIGS. 3, and 6 to 8.

FIG. 3 is a flow chart of a series of particle analysis processes, that is, a data processing method, performed in the analysis step S30 with the image and photographing factor information acquired in the photographing step S20.

FIGS. 6 to 8 show examples of how the results change when the intermediate output data generated in the process of analyzing the recorded images by the analysis unit 164 according to the flow chart shown in FIG. 3 have different analysis options T12. The data processing method performed in the analysis step S30 will be examined in detail with reference to these examples.

Analysis Option Schedule Table Selection and Script Application

First, an analysis option schedule table T12 containing the algorithm and analysis factors used in analysis is selected for each frame of consecutive images, and then the analysis option schedule table T12 is applied to the image analysis and particle tracking script.

Specifically, referring to FIG. 3, a frame-by-frame schedule table T10 is drawn up in advance, and when the analysis step begins, previously photographed image data are loaded into the image buffer so that the processor of the analysis unit can read them. At the same time, the user interface unit of the analysis means 106 requests the user to finally review and modify the analysis option schedule table T12 extracted from the frame-by-frame schedule table T10 (S39), and returns the algorithm (or function), analysis factors (S33), and the like to be used for analysis for each image frame to the image analysis and particle tracking script (S32) when the analysis option schedule table T12 is confirmed.

The script that takes over S33 finds within S33 and applies analysis functions and factors that correspond to the number of frames of the image received from S31, and then outputs the raw observation data T14 in the relevant frame.

The script of S33 is not limited to processing the image analysis and particle tracking processes at once, but can proceed with the detailed processes separately.

Looking at the flow of the specific analysis process described below with reference to FIGS. 6 to 8, the image analysis and particle tracking processes are explicitly separated. Through these drawings, it is possible to check the data generated in the intermediate process during analysis, and the data flow of the analysis process can be seen as an example under the assumption that data classification by channel is performed immediately after image analysis.

At this time, even if the series of scripts use different functions and algorithms for each step, the script of S33 generates data with a consistent structure required for the next step to be executed desirably in each step and, when the structure is not satisfied depending on the implementation type of the function, specifies a mark requesting exception processing in the data or includes data recording the frame requiring exception processing and the name of its value, and the exception processing method.

Image Analysis

FIG. 6 shows analysis options reflected when analyzing example image information T13 frame by frame in the image analysis step S32, and is an example of raw observation data T14 in which those extracted from the analysis option schedule table T12 of FIG. 4 and the relevant analysis options are reflected.

Specifically, image analysis separates and inputs information on provisional particles derived from the frame-by-frame image T13 into each channel based on the analysis option schedule table T12. The information on the provisional particles may be the identification (ID), position, and brightness values of the provisional particles.

Referring to FIG. 6, Frame 1 of the frame-by-frame image T13 is given the analysis option designated in the first row of the analysis option schedule table T12 to perform a peak detection process of segmenting and finding the bright part of the image. As a result, a dotted circle is drawn at the point where the particle is estimated to be present, and localization, an algorithm that accurately estimates the center of the particle, is performed to make it possible to specify the exact center point of the estimated particle point indicated by the "+" mark. In addition, the intensity channel was set to become number 1, and the image brightness values of the measured particle region were measured to fill the inside of the circle with a distinguishable color appropriate for the channel as an indication that the relevant brightness was measured.

The above-described specification method and the diagram in which it is implemented can actually be read during the analysis process depending on the settings of the user interface unit, but since it is usually internalized and not displayed on the user interface unit, the diagram of the frame-by-frame image T13 is schematized in order to help understanding of the technology.

Meanwhile, referring to the raw observation data T14 at the end of image analysis, the ID, exact position, and brightness values of the provisional particles found during image analysis are input in the region corresponding to Frame 1 so that each particle occupies one row. In the case of brightness values, they are input into the column corresponding to Channel 1 and go through a process S36 of being separated and listed. Here, as described above, the separation of measurement values for each channel is not limited to being executed at S36 time point in FIG. 3, but can be adjusted to be executed at any step after S32, before S37, or adjusted to be integrated into the algorithm of S32 and executed.

Referring again to Frame 2 of the frame-by-frame image T13, since it received a command through the process of S33 not to perform the localization function (algorithm) unlike in Frame 1 so that only the ambiguous (low-precision, low-accuracy) position coordinates of a bright region where particles are estimated to be present are returned. At this time, referring to the raw observation data T14, the precision of the position coordinates of Frame 2 is expressed as reduced unlike the results of the particles in Frame 1. Additionally, since Frame 2 has been assigned Channel 2, the brightness values are substituted in the column corresponding to Channel 2 in the raw observation data T14.

Looking at Frame 3 again, the same algorithm as Frame 1 was performed, but since a valid channel value was not given through S33 in the measurement of brightness, the brightness values are not recorded anywhere in the raw observation data T14. Here, 'invalid' refers to the case where a number included in the exception rule additionally stipulating the analysis is input, and in this exception rule, all or some of 0, negative numbers, non-integer numbers, etc. may be selected, or it may be in an empty state where no value is not substituted at all.

When Frame 4 is reviewed, since it has been set not to call both of peak detection and localization functions, and thus coordinate values are not returned so that it can be reviewed that it has coordinates of [0,0] by comparing it with the results of Frame 3 in the raw observation data T14. However, the intensity channel is assigned as 3, and in this case, the coordinates measured in the previous frame are read as reference coordinates, and the brightness of the image around it is obtained and recorded. When receiving and recording the reference coordinates, a row of data with the same ID as the ID of the reference coordinates should be created. Here, when no valid coordinate values are received, leaving the position row blank is also a valid notation method. Additionally, the method of receiving reference coordinates is not limited to receiving the coordinates of adjacent frames, additional algorithms, such as obtaining an image of the velocity vector by analyzing the differences between consecutive images, may be added, and in this case, the coordinate values are specified and expressed.

Particle Tracking Process

Once the image analysis is completed, the particle tracking process is performed.

The particle tracking process selects the pair of particles with the highest probability considering the shape, brightness, and position of the particle in each frame from the raw observation data T14, considers them to be the same particle, and connects the values considered as a particle with the same ID to generate particle tracking data T15 for each particle.

FIG. 7 is an example of the items of the analysis option schedule table T12 reflected when performing the particle tracking method with the raw observation data T14 of FIG. 6 and the particle tracking data T15 that is the result of performing the relevant tracking method.

Specifically, when the image analysis is completed and the raw observation data T14 from all frames are obtained, a particle tracking process is executed to generate a vector connecting pairs of values that are considered to be the same particle for each frame. The list of connected vectors is executed as the process of S35 and finally generates particle tracking data T15 for each particle. As described above, only particle tracking data T15 can be output directly from the image without the raw observation data T14 being explicitly generated depending on how the algorithm is implemented.

In the particle tracking process, whether or not the frame contributes to the tracking process is determined by referring to the tracking column in the analysis option schedule table T12. Here, contribution means that although it can be the object of particle tracking, it is not used as reference coordinates for tracking other next particles. Here, the fact that the analysis option is limited to the tracking column only in reflecting the level of contribution is merely an example to compare and explain how the analysis process and data form vary depending on the frame, and may additionally include a method of taking over functions and factor pairs, which allows other tracking methods or other criteria to be applied, without being limited to the level of contribution.

In the particle tracking process, the shape, brightness, and position of the particles are considered, and the pair of particles with the highest probability is selected, considered to be the same particle, and connected. Here, connection means matching the IDs of the two particles and writing side-by-side the raw observation data of the two particles in the data table assigned to the relevant IDs. Here, if the same particle is continuously observed according to the frame, the table of raw observation data T14 has rows increased by the number of connections.

In this process, algorithms that are accompanied by various probabilistic inferences without being limited to one method can be compositely used.

According to the raw observation data T14, since the data in Frame 4 do not have valid coordinate values, and the image analysis algorithm has a history of using coordinates from the previous frame as reference coordinates, a tracking method based on shape, brightness, and position is excluded and particles with the same ID in the previous frame are connected to each other. Here, according to the analysis option schedule table T12, Frame 4 is set not to contribute to tracking, and when the results of the particle tracking data T15 are reviewed, Particle 1 was given a row of measured values at a 100 ms time point corresponding to Frame 4, but coordinates were not given.

Meanwhile, Particle 1 was observed 4 times during 4 frames and has 4 rows, but since Particle 2 had never been observed in Frame 2 (since it did not react to the 488 nm light source used for photographing Frame 2), the relevant row was missing and it has 3 rows. Particle tracking data T15 are generated only from the raw observation data T14 that was effectively mobilized for tracking, and has different row sizes for each particle. Since the size of the row is not standardized, the particle tracking data T15 can be stored in the form of a structure.

Entire Particle Information Calculation

Once the particle tracking analysis is completed, information on all particles is obtained from the obtained individual particle tracking data T15. At this time, the information is numerical values that can be interpreted mathematically, physically, and biochemically obtained from the ID, position, and brightness of the particles, and may be, for example, particle size, number of particles, particle concentration, Brownian motion trajectory, etc.

Specifically, when particle tracking data T15 are generated by executing both S35 and S36 for one image file, the analysis process is carried out as a step S37 of calculating meaningful values that express the characteristics of the particles in FIG. 3 so that they can be interpreted mathematically, physically, and biochemically.

At this time, S37 is preferably executed after going through the step S34 of returning combinations of the type of target calculated value (or handle of the function to be executed) and the list of frames to be used for the relevant calculated value from the analysis option schedule table T12.

FIG. 8 is an example of displaying the items of the analysis option schedule table T12 reflected in the process of creating the carefully selected data tables T16 and T17 used to derive the final output value from the particle tracking data T15 of FIG. 6 from the particle tracking data T15 of FIG. 6, and values on particle tracking data T15 that are handled as valid or invalid in the calculation process when the respective options are reflected.

According to FIG. 8, the analysis option schedule table T12 includes parameter used places (columns) called Counting and Sizing. In S37, the used place called Counting calls a function that calculates the extent to which particles exist in the sample, and the used place name called Sizing is based on calling a function that measures the magnitude of the Brownian motion of the particle to derive the diameter. In the relevant column, whether to contribute measurement values to the relevant parameter used place for each frame (between rows) or not is input as a parameter. Here, it may be replaced by inputting the handle of a function (not a basic function) that is valid for the used place of the relevant parameter in the form of a parameter without being limited to parameters separated by Y/N as described above.

Only the specific data region T16 required by the function called Number estimation, which is used when including the quantity of particles in the final output value, was extracted from the particle tracking data T15.

The number of particles is defined as an average between frames of a value obtained by dividing the number of particles found on the screen by the volume 130 of the effective measurement region. At this time, the values of frames that will not be used are omitted by referring to the parameter values for used places of Counting in the analysis option schedule table T12. As a result, even in frames where particles have actually been observed, specific frames are forcibly omitted depending on the settings of the analysis factors. In FIG. 8, these omission results are indicated by overlaying a red line.

Specifically, the data columns measured in Frames 2 and 4 are ignored, and only the values measured in the remaining frames contribute to the calculation process. Here, in the case of Frame 4, the frame in which both peak detection and localization were not performed was not verified to be a valid particle at all, and the ID and coordinates were inherited from the previous frame and used so that the environment variable settings in the analysis option schedule table T12 are ignored and the algorithm can forcibly omit the frame.

Meanwhile, if particle size information is needed among the final output values obtained from particle tracking data T15, the size estimation function may be used.

The function of particle size (size estimation) extracted only the particle coordinate values needed by the function itself and the time values indicated by the relevant coordinate values from the analysis option schedule table T12 (T17). Here, since only the values of Frame 1 are designated to be used for size estimation, the values measured in the remaining frames are omitted regardless of whether valid values exist or not. Here, rows that are not given valid coordinate values during the process of executing the size estimation function may be ignored regardless of the analysis option schedule table T12.

Additionally, the interface unit may include a function to prevent the value of the Sizing column of the relevant frame from being changed if the analysis unit detects that valid coordinate values will not be given in the S39 process. If a pattern of special analysis options such as in Frame 4 is similarly detected even in the Counting column, additional analysis restrictions may be placed to prevent the Counting column of the relevant frame from being changed.

Finally, the particle analysis process may be completed by outputting and storing information on the databased group of particles (S38) so that it can be converted and processed into a group of data with physically and biochemically meaningful units desired by the user.

FIGS. 9 and 10 show two examples of benefits in the analysis process and result that can be obtained through the present invention. The number of benefits in the analysis process and result may increase as the type of value to be calculated increases in the process of calculating the expression value (S37) without being limited thereto.

FIG. 9 is a diagram depicting a situation in which the coordinates of a particle are obtained by finding the center point of a potential particle through localization on the image frame in the image analysis process S32. The image on the left shows a situation where the particle image is very bright so that the signal-to-noise ratio (SNR) is high, and the image on the right shows a situation where the particle is very dark so that the SNR is low. The yellow circle in the center is the error range (68% confidence range) of the center coordinates expected for the SNR of the relevant image degree. In the image on the left, the particle shape is clear and the bright center point is easily recognizable so that the error range of the center point is narrow. However, in the image on the right, the shape of the particle is unclear due to a lot of noise to increase the possibility of misjudging the position of the center point, and due to this, widening of the error range of the center point is expressed. Since the error in the particle's coordinates every hour is accumulated if the Brownian motion trajectory of a particle is analyzed, and the Stokes-Einstein formula is used to find the size of the particle, the accuracy in each frame directly affects the accuracy of the measured diameter of the particle. For this reason, in order to accurately measure particle diameter, it is possible to exclude coordinate measurement values in frames where SNR is expected to be low (T17), which can be achieved by introducing an analysis schedule table T12. Such a benefit in coordinate measurement is not limited to size measurement through Brownian momentum, but can also be applied to the accuracy in the process of analyzing the behavior of particles when external forces such as electrophoresis, sonophoresis, and the like are applied.

FIG. 10 is a comparative example showing the difference in resulting quantity values depending on whether or not the analysis option schedule table T12 of the present invention is introduced in the process S37 of measuring the quantity of particles in the sample, and it was assumed that there are three particles in the screen.

In FIG. 10, a situation is assumed in which particle 1, which emits scattered light and all fluorescence, particle 2, which is marked with a substance excited by scattered light and a blue light source, and particle 3, which does not have any fluorescent substance and thus emits only scattered light, are contained in the measurement region 130. In addition, it is expressed for one cycle in which all scattered light and fluorescence are observed through a predetermined schedule through the arbitrary photographing option schedule table T11.

In particle tracking analysis, the number of valid particles shown on the screen is divided by the total number of frames and averaged to calculate the number of observed particles, and the concentration of particles is obtained by dividing this by the volume of a measurement region 130 derived in advance. Assuming that the volume of the measurement region is constant, the change in the number of observed particles can be said to be the only variable that determines the particle concentration.

The diagram at the top of FIG. 10 shows a situation in which, as in the past, the analysis option schedule table T12 is not introduced so that events in which all particles are measured are reflected in the particle quantity measurement equation.

The presence or absence of a fluorescence signal varies depending on the type of particle so that the number of frames observed to each other varies, and thus the total number of observed events per particle varies. In reality, although the presence proportions in the measured volumes of particles 1 to 3 are the same, it is incorrectly calculated that more particles emitting much fluorescence exist when substituted in the actual particle quantity calculation. The total number of frames is also set to use the number of all frames regardless of differences in photographing environments so that the final particle quantity can also be seen falling to a lower value (2.285) rather than the previously assumed 3.

The diagram at the bottom of FIG. 10 shows a situation in which the analysis option schedule table T12 presented in the present invention is introduced and set to exclude particle measurement events in a specific frame. Here, the analysis options were set to reflect only scattered light events (gray circles) in the quantity calculation and exclude fluorescence events (colored circles). Since all particles commonly emit scattered light if the particle quantity is calculated by reflecting this, there is no difference in the number of events depending on the presence or absence of fluorescent substances, which is the same as the presence proportion of each particle assumed in advance. In addition, the total number of frames is also calculated using the number of frames excluding the excluded frames in the calculation so that it can be seen that the number of particles is shown to be 3, the same as the number of particles assumed in advance.

As a result, if the analysis option schedule table T12 is introduced so that only the frames in which all particles are expected to emit light in common without discrimination are selected in the quantity calculation, it is allowed to measure them accurately without misjudging not only the presence proportion of each particle but also the concentration of the entire particle group.

The present invention can achieve various mistakes and errors that occur in the existing particle tracking analysis methods by varying the operation behavior of the analysis method for each frame. For this purpose, the algorithm and environmental variables, which are applied, and valid measurement values to be used at each step are defined in advance so that the analysis system continuously reference them, and ultimately, the physically, mathematically, and biochemically meaningful individual particle characteristic values desired by the user are obtained with high accuracy, and there is an advantage of being able to output a database based on them.

In addition, the analysis method and system of the present invention can arbitrarily set the measured value in each image through the user interface unit to prevent misjudgment of the particle concentration or the position in the next image in advance, or can selectively exclude measurement values capable of reducing the accuracy in the particle brightness and particle size for each fluorescence/scattered light.

In addition, it is possible to reduce required analysis time by omitting calculations to obtain unnecessary measurement values during the analysis process or allowing other algorithms capable of increasing the precision and calculation speed of other measurement values to be applied while sacrificing accuracy for unnecessary measurement values.

In addition, the method and system according to the present invention can read the presence or absence of two or more different fluorescent substances of individual particles observed through a particle observation and analysis system, and enable simultaneous quantitative analysis for all particles observed on the image.

In addition, the size of the relevant particle can be measured from the trajectory of the particle tracked through photographing repeated in time series, and additionally, various physical properties of the relevant particles associated with each external force can be analyzed by tracking and analyzing changes in the trajectories of individual particles changed when an external force is applied by applying electrophoresis, dielectric phoresies, thermophoresis, and vibration to the particle sample to be analyzed.

In the above detailed description of the present invention, only special embodiments according thereto have been described. However, it should be understood that the present invention is not limited to the particular form mentioned in the detailed description, but it rather has to be understood to include all modifications, equivalents and substitutes within the spirit and scope of the present invention as defined by the accompanying claims.

EXPLANATION OF REFERENCE NUMERALS

| 100: | Analysis system |
| --- | --- |
| 101: | Light source unit |
| 102: | Control unit |
| 103: | Sample holder |
| 104: | Imaging optical system |
| 105: | Photographing unit |
| 106: | Analysis means |
| 110: | Light source |
| 112: | Light guide |
| 114: | Light concentrating means |
| 130: | Sample receiving unit |
| 140: | Objective lens |
| 142: | Mirror |
| L1, L2: | Conducting wire |
| 160: | Image processing unit |
| 162: | Trajectory tracking unit |
| 164: | Trajectory analysis unit |
| T10: | Frame-by-frame schedule table |
| T11: | Photographing option schedule table |
| T12: | Analysis option schedule table |
| T13: | Frame-by-frame image |
| T14: | Raw observation data |
| T15: | Particle tracking data |
| T16, T17: | Final output value |

INDUSTRIAL APPLICABILITY

The present invention relates to a particle analysis method and analysis system for analyzing individual particle characteristic values with high accuracy through optical observation.

The invention claimed is:

1. A particle analysis method comprising:
a photographing preparation step (A) of holding a particle sample to be analyzed on a sample holder and then inputting a photographing option schedule table and an analysis option schedule table into an input device of a user interface;
a photographing step (B) of calling a light source according to the photographing option schedule table and then controlling the photographing time to obtain consecutive image frames; and
an analysis step (C) of analyzing the characteristics of individual and entire particles according to the analysis option schedule table from the consecutive image frames obtained in the photographing step;
wherein the analysis step (C) comprises steps of:
selecting an analysis option schedule table including an algorithm and analysis factors used for analysis for each frame of consecutive images;
applying the analysis option schedule table to an image analysis and particle tracking script;
obtaining raw observation data through image analysis by applying analysis functions and parameters to each image frame previously photographed by the script;
executing a particle tracking process from the raw observation data to obtain individual particle tracking data by grouping cases considered to be the same particle; and
obtaining information on all particles by collecting the obtained individual particle tracking data.

2. The particle analysis method of claim 1, wherein photographing is performed until the remaining number of photographing is filled by returning to the beginning and repeating the same schedule when a command is received to take more images than those of the photographing option schedule table.

3. The particle analysis method of claim 1, wherein the analysis option schedule table is continuously entered so that the function to be used in each step of the script, the input value of the function, and the output of the function is capable of being applied differently to each image frame.

4. The particle analysis method of claim 1, wherein the analysis option schedule table includes environment variables that specify for each frame which values of the intermediate output values generated during the process of proceeding the above series of scripts are used as input data when calling a specific function throughout the analysis process belonging to a specific step of the series of scripts or at any time point.

5. The particle analysis method of claim 1, wherein the analysis option schedule table includes an additional command consisting of a bundle of a step to be executed, a handle of a function to be executed, a name of a value to be derived, and a list of frames to be used in the function, and an additional command column in which a number of additional commands are recorded.

6. The particle analysis method of claim 1, wherein the analysis option schedule table is automatically drawn up and arranged through the user interface, optimal behavior and environmental variables are automatically arranged by detecting undefined analysis factors, and particle behavior in which measurement is difficult or it is difficult to trust the results, and different algorithms are applied partially or entirely depending on the analysis option.

7. The particle analysis method of claim 1, wherein even if the series of scripts use different functions and algorithms for each step, data with a consistent structure necessary for the next step to be executed desirably are generated in each step, and if the structure is not satisfied depending on the implementation type of the function, a mark requesting exception processing is specified in the data, or a table recording the frame requiring exception processing and the name of its value and the exception processing method is included.

8. The particle analysis method of claim 1, wherein the image analysis generates raw observation data by separating particle information including the ID, position, and brightness values of provisional particles derived from the image for each frame into each of the channels based on the analysis option schedule table.

9. The particle analysis method of claim 1, wherein the particle tracking analysis considers the selected pair of the particles to be the same particles by selecting the pair of particles with the highest probability of matching considering the shape, brightness, and position of the particles in each frame from the raw observation data, but assigns different weights to each particle's shape, brightness, and position based on the reliability given differently for each frame according to the analysis option schedule table, reassigns the same particle identification (ID) to a bundle of the measurement values of provisional particles considered to be the same particles, and connects measurement values for particles with the same ID to generate particle tracking data for each particle.

10. The particle analysis method of claim 1, wherein the information on all particles is to simultaneously obtain one or more selected from particle size, particle number, particle concentration, Brownian motion trajectory, and the result value of the additional command.

* * * * *